(12) United States Patent
Dou et al.

(10) Patent No.: US 8,087,293 B2
(45) Date of Patent: Jan. 3, 2012

(54) OIL-GAS-WATER MULTI-PHASE FLOW ADJUSTING APPARATUS AND OIL-GAS-WATER MULTI-PHASE FLOW RATE MEASURING APPARATUS AND MEASURING METHOD

(75) Inventors: Jianwen Dou, Gansu (CN); Jinsong Wan, Gansu (CN); Ligang Zhang, Gansu (CN)

(73) Assignee: Haimo Technologies, Inc. (CN)

( * ) Notice: Subject to any disclaimer, the term of this patent is extended or adjusted under 35 U.S.C. 154(b) by 1010 days.

(21) Appl. No.: 10/556,999

(22) PCT Filed: May 16, 2003

(86) PCT No.: PCT/CN03/00359
§ 371 (c)(1),
(2), (4) Date: Nov. 3, 2006

(87) PCT Pub. No.: WO2004/102131
PCT Pub. Date: Nov. 25, 2004

(65) Prior Publication Data
US 2007/0089609 A1 Apr. 26, 2007

(51) Int. Cl.
*G01F 15/08* (2006.01)
*B01D 19/00* (2006.01)
*B04C 9/00* (2006.01)
(52) U.S. Cl. ............. 73/200; 73/64.56; 73/199; 73/201; 96/208; 96/215; 96/422; 210/188; 210/262
(58) Field of Classification Search ............ 73/199–201, 73/197, 61.44, 61.56, 19.1, 19.12, 861.04; 210/512.1, 319–320, 294, 259–260, 262, 210/188, 787, 790, 806; 96/207–209, 215–216, 96/420–422, 413, FOR. 166; 95/219, 260–261, 95/269, 271–272; 55/385.1, 456–457, 459.1, 55/482
See application file for complete search history.

(56) References Cited

U.S. PATENT DOCUMENTS
3,481,118 A * 12/1969 Swann et al. ............ 55/459.1 X
(Continued)

FOREIGN PATENT DOCUMENTS
CN 1072609 Y 6/1993
(Continued)

OTHER PUBLICATIONS
European Office Action Sep. 16, 2010.

*Primary Examiner* — Thomas P Noland
(74) *Attorney, Agent, or Firm* — Knobbe, Martens, Olson & Bear LLP

(57) ABSTRACT

The invention relates to an oil-gas-water multi-phase flow adjusting apparatus, which mainly comprises an inlet accelerating pipe section, a vortex flow guide spiral pipe, a gas circuit exit connection pipe section, a liquid receiving cone, a mixed liquid relief exit connection pipe section and a sampler exit connection pipe section, and which has the function for changing at intervals the flow pattern, the flow state and the components of the oil-gas-water multi-phase flow. The invention also relates to an oil-gas-water multi-phase flow rate measuring apparatus and its measuring method. The measuring apparatus comprises a blind three-way mixing means, a pressure differential type flow measuring device, a single-γ phase volume fraction meter, a dual-γ phase volume fraction meter, an oil-gas-water multi-phase flow adjusting apparatus and a computing system. The measuring method is as follows: the single-γ phase volume fraction meter and the dual-γ phase volume fraction meter measure the gas content GVF and the water content WC respectively; the pressure differential type flow measuring device measures the differential pressure ΔP of the total flow rate; the computing unit computes the oil flow rate Qo, the gas flow rate Qg and the water flow rate Qw.

10 Claims, 3 Drawing Sheets

U.S. PATENT DOCUMENTS

| | | |
|---|---|---|
| 4,278,550 A | 7/1981 | Watts |
| 4,414,112 A * | 11/1983 | Simpson et al. ............ 210/512.1 |
| 4,424,068 A | 1/1984 | McMillan |
| 4,852,395 A | 8/1989 | Kolpak |
| 4,857,197 A * | 8/1989 | Young et al. ................ 210/512.1 |
| 4,881,412 A | 11/1989 | Northedge |
| 4,948,396 A | 8/1990 | Barnes et al. |
| 5,218,840 A * | 6/1993 | Kolpak ......................... 73/61.44 |
| 5,252,229 A | 10/1993 | Rojey et al. |
| 5,390,547 A | 2/1995 | Liu |
| 5,565,101 A * | 10/1996 | Kuntz .................... 210/512.1 X |
| 5,866,000 A * | 2/1999 | Yeh ........................ 210/512.1 X |
| 6,190,543 B1 * | 2/2001 | Christiansen .......... 210/512.1 X |
| 6,209,388 B1 | 4/2001 | Letton et al. |
| 7,638,062 B2 * | 12/2009 | Movafaghian et al. ... 210/188 X |
| 7,708,146 B2 * | 5/2010 | Kruyer .................. 210/512.1 X |
| 2007/0084340 A1 * | 4/2007 | Dou et al. ........................... 95/8 |
| 2010/0006488 A1 * | 1/2010 | Folkvang ................. 210/170.01 |
| 2011/0139710 A1 * | 6/2011 | Zhang .................... 210/512.1 X |
| 2011/0174741 A1 * | 7/2011 | Sarshar et al. ............ 210/787 X |

FOREIGN PATENT DOCUMENTS

| | | |
|---|---|---|
| CN | 1130235 A | 4/1996 |
| CN | 1182873 A | 5/1998 |
| CN | 2293799 Y | 10/1998 |
| CN | 2325761 Y | 6/1999 |
| CN | 2348358 Y | 11/1999 |
| CN | 2455329 Y | 10/2001 |
| CN | 2458523 Y | 11/2001 |
| CN | 2537960 Y | 2/2003 |
| DE | 199 26 388 A1 | 12/2000 |
| EP | 0383585 A | 8/1990 |
| EP | 1 666 153 B1 | 7/2010 |
| FR | 2219672 A * | 10/1974 |
| WO | WO 89/02066 A | 3/1989 |

* cited by examiner

OIL-GAS-WATER MULTI-PHASE FLOW ADJUSTING APPARATUS AND OIL-GAS-WATER MULTI-PHASE FLOW RATE MEASURING APPARATUS AND MEASURING METHOD

FIELD OF THE INVENTION

The invention relates to an oil-gas-water multi-phase flow adjusting apparatus mounted to an oil line of oil field, and a measuring apparatus and a measuring method using the adjusting apparatus and being adapted for measuring oil-gas-water multi-phase flow rate in an oil line of oil field.

DESCRIPTION OF THE PRIOR ART

The changes of each phase production flow rate in oil-gas-water three-phase product in oil wells are the basic data of the oil production of oil field, and are the main basis for monitoring and controlling the dynamic characteristics of oil wells and oil reservoir.

In order to measure mentioned-above data, a conventional method is to deliver the products of many oil wells into a metering separator alternatively, to separate the products of oil wells into three single-phase fluids of oil, gas and water by means of the metering separator, and then to meter them at respective exit respectively. When the metering separator separates the products of oil wells into a gas-liquid two-phase fluid, the total flow rates of gas and liquid are measured respectively, and the productions of the oil and water in the liquid-phase fluid are generally measured by a sample analyses method, a density measuring method or other component measuring methods to obtain the respective proportion of oil and water and then to calculate the flow rates of oil and water.

Since a same separator is used by many oil wells in an oil field, the continuous metering operation can not be realized for a single oil well and the separator has poor separation effects for high production oil wells, so that the metering results have poor representatives and great errors. Secondly, since the structure and the flow process of the oil-gas-water three-phase separator are complex, and the metering separator and its related accessories generally have tens of tons in weight and occupy an area in several hundreds of square meters, to make the maintenance and management of the metering separator system quite complex and miscellaneous and have more links needed to be controlled, so that the costs of establishment, operation and maintenance of the station are high to not facilitate the automatization of the production process and the management to be realized, and such defects are presented more prominently for oil fields in desert and on the sea.

A multiphase flow metering system disclosed in recent years can measure the flow rate of each phase in the oil-gas-water multi-phase flow mixture without necessity for separating oil, gas and water. However, since the oil-gas-water multi-phase flow in the pipe is an extreme complex random process having multi-variables, different flow patterns exhibit under different conditions. Furthermore, in the products of oil wells, the relative contents of the three components of oil, gas and water may change greatly: the products may have high gas content (the gas content is 100%) or be all liquid (the gas content is 0%); in the liquid phase, the liquid may be all oil (the water content is 0%) or have high water content (the water content is more than 95%). And the products may be in any combination of the above extreme values. Accordingly the existing various multiphase flow rate measuring apparatus, no one excepted, can only be adapted to one or a few flow patterns and some flow rate range, and cover a part of combination of gas content and water content. This, to a great extent, limits the extension and use of the multiphase flow rate measurement technology in the production practice.

SUMMARY OF THE INVENTION

Therefore, a first object of the present invention is to provide a multiphase flow adjusting apparatus mounted to an oil line and having a small volume and light weight to change the components and the flow states of the oil-gas-water multi-phase flow, so as to meet the requirement for measuring the multiphase flow.

A second object of the present invention is to provide an oil-gas-water multi-phase flow rate measuring apparatus which is mounted to an oil line and uses the oil-gas-water multi-phase flow adjusting apparatus of the present invention to continuously measure the oil-gas-water multi-phase flow.

A third object of the present invention is to provide an oil-gas-water multi-phase flow rate measuring method by using of the oil-gas-water multi-phase flow rate measuring apparatus to measure the oil-gas-water multi-phase flow.

In order to achieve the first object, the invention is to provide a multiphase flow adjusting apparatus mounted to an oil line, this apparatus comprises a case, an inlet accelerating pipe section mounted to the case, an inlet pipe section connection flange, a gas circuit exit connection pipe section, a mixed liquid relief exit connection pipe section, a sampler and a sampler exit connection pipe section. A vortex flow guide spiral pipe, a liquid receiving cone and a cone mixer pipe section are provided inside the case. The oil-gas-water multi-phase flow, which enters into the apparatus from an inlet, is accelerated and then separated in vortex flow, a part of gas is discharged from the gas circuit exit, and the remained oil-gas-water multi-phase flow enters into the liquid receiving cone and continues to rotate naturally, so as to form secondary separation, the separated oil-water liquid flows into a liquid reservoir formed at the lower portion of the case through the cone mixer pipe section, the mixed liquid relief exit is a means for controlling the height of the liquid level in the liquid reservoir, a part of liquid in the liquid reservoir is relieved from the mixed liquid relief exit, so as to keep the liquid level of the liquid reservoir at a certain height; a part of liquid, after being sampled by the sampler, enters into a phase volume fraction meter through the sampler exit connection pipe section to measure the water content WC.

In order to achieve the second object, the invention is to provide an oil-gas-water multi-phase flow rate measuring apparatus which is mounted to an oil line and uses the oil-gas-water multi-phase flow adjusting apparatus of the present invention, this measuring apparatus further comprises a connection pipe section mounted to the inlet connection flange of said oil-gas-water multi-phase flow adjusting apparatus, and a metering pipe section connected with the connection pipe section, the metering pipe section comprising a single-γ phase volume fraction meter, a pressure differential type flow measuring device, a blind three-way mixing means as well as a temperature transducer, a pressure transducer and a pressure differential transducer which are mounted to this metering pipe section. The oil-gas-water multi-phase flow rate measuring apparatus further comprises a dual-γ phase volume fraction meter, a flow collection pipe section, and a computer calculation system which are mounted to the sampler exit connection pipe section of said multiphase flow adjusting apparatus to calculate a total volume flow rate Q, an oil volume flow rate $Q_o$, an gas volume flow rate $Q_g$ and a water volume flow rate $Q_w$ of the oil-gas-water multi-phase flow.

In order to achieve the third object, the invention is to provide a measuring method for measuring an oil-gas-water multi-phase flow, this method comprises the following steps:

1) Making the oil-gas-water multi-phase flow in the oil pipe enter into the blind three-way mixing pipe section. The blind three-way mixing pipe section changes the flow pattern of the oil-gas-water multi-phase flow and mixes the oil-gas-water multi-phase flow.

2) Making the oil-gas-water multi-phase flow passed through the blind three-way mixing pipe section enter into the metering pipe section which comprises the single-$\gamma$ phase volume fraction meter, the pressure differential type flow measuring device, the temperature transducer and the pressure transducer, and which measures the differential pressure $\Delta p$ of the total flow rate, the gas content, the temperature and the pressure of the oil-gas-water multi-phase flow.

3) Making the uniformly mixed oil-gas-water multi-phase flow passed through the metering pipe section enter into said oil-gas-water multi-phase flow adjusting apparatus.

4) Said oil-gas-water multi-phase flow adjusting apparatus of the invention adjusts the oil-gas-water multi-phase flow, so that a part of the liquid-contained gas is discharged from the gas circuit exit, the excess oil-gas-water mixed liquid in the liquid reservoir is discharged through the mixed liquid relief exit of the liquid reservoir and enters into the flow collection pipe section, and a part of uniformly mixed liquid having lower gas content, via the sampler exit connection pipe section enters into the dual-$\gamma$ phase volume fraction meter to measure the water content WC of the liquid phase.

5) Calculation

The volume flow rate of the oil-gas-water multi-phase flow is to be calculated. By the flow rate herein is meant the volume flow rate hereafter referred to as simply flow rate.

The calculation equations are as follows:

The total flow rate: $Q = K \cdot \sqrt{\Delta p / \rho}$
The oil flow rate: $Q_o = Q \cdot (1-GVF) \cdot (1-WC)$
The gas flow rate: $Q_g = Q \cdot GVF$
The water flow rate: $Q_w = Q \cdot (1-GVF) \cdot WC$ where,
$\Delta p$ is the differential pressure value, and $\rho$ is the oil-gas-water mixed density.

$$\rho = [\rho_{water} \cdot WC + \rho_{oil} \cdot (1-WC)] \cdot (1-GVF) + \rho_{gas} \cdot GVF$$

The oil-gas-water multi-phase flow rate measuring apparatus using the oil-gas-water multi-phase flow adjusting apparatus can be directly mounted to an oil line, and the oil-gas-water multi-phase flow adjusting apparatus improves the flow pattern, the flow state and the interval components of the multiphase flow, so as to increase the measurement range and the measurement accuracy of the multi-phase flow rate measuring apparatus. Particularly in the case of high gas content, the flow rate and the water content can be measured more accurately.

The oil-gas-water multi-phase flow rate measuring apparatus using the multiphase flow adjusting apparatus of the invention has the following advantages: it occupies less area (less than 2 m$^2$), has less weight (less than 2 tons), connects an oil pipe conveniently, not forms a suppressed pressure thus to have a good safety, not causes any hurt to the measured media, can measure an oil-gas-water multi-phase flow on line continuously and accurately, it also can be used as a portable and movable well measuring apparatus and directly mounted to a wellhead and a platform to measure production, pressure, temperature, water content and gas content of the oil-gas-water for an single well, this apparatus can be further conjuncted with a oil well control system to automatically monitor an oil well.

BRIEF DESCRIPTION OF THE DRAWINGS

Those and other objects, features and advantages of the invention will be apparent from the following detail description of the embodiments made with reference to the attached drawings.

DETAILED DESCRIPTION OF THE PREFERRED EMBODIMENT

Hereinafter, the embodiments of the invention are described in detail with reference to the drawings.

Figure 1:
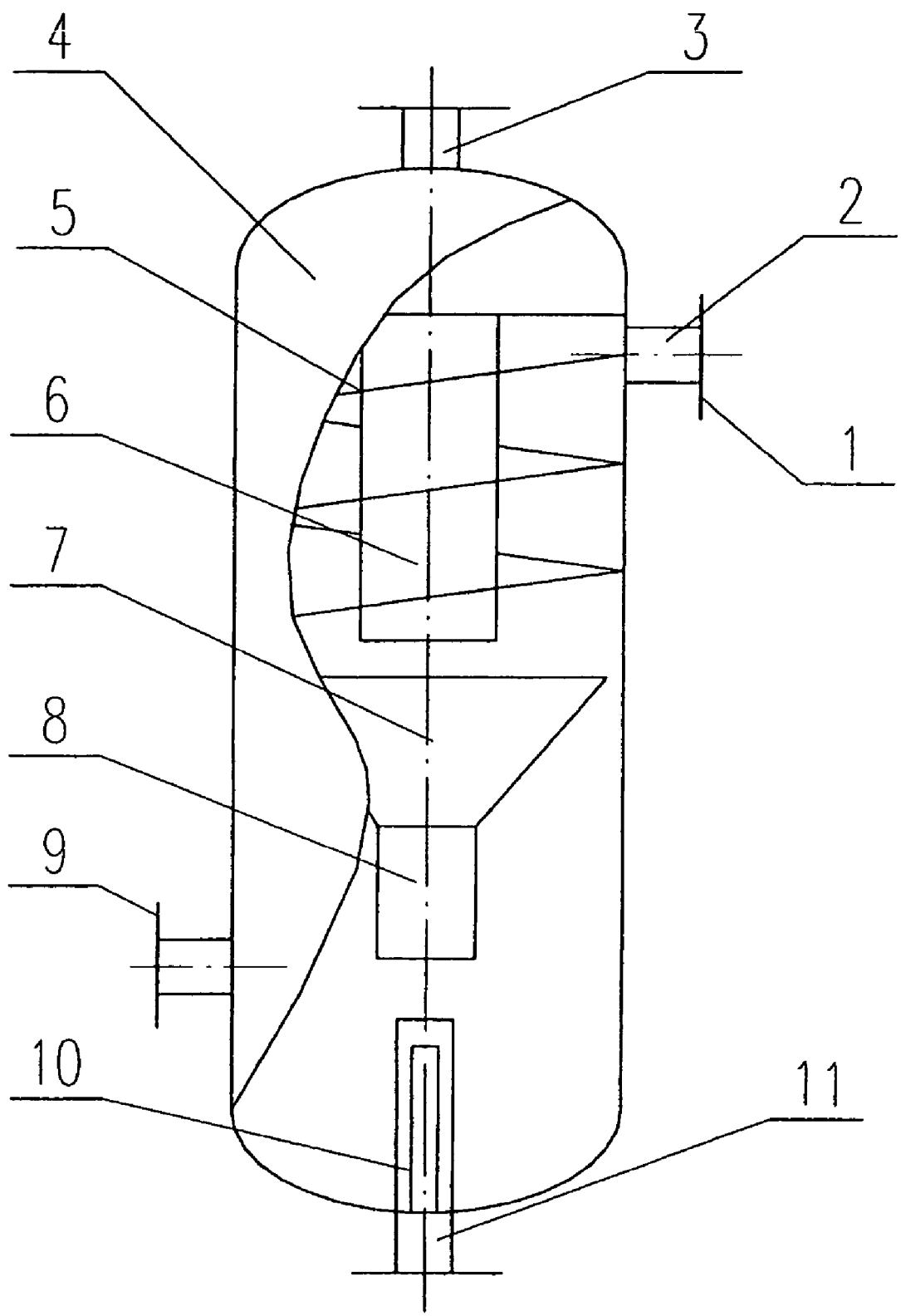
FIG. 1 is a schematic diagram of an embodiment of a multiphase flow adjusting apparatus of the invention.

FIG. 1 shows an embodiment of an oil-gas-water multi-phase flow adjusting apparatus of the present invention.

In FIG. 1, a reference number 1 represents an inlet connection flange of an oil-gas-water multi-phase flow adjusting apparatus, 2 represents an inlet inside reducing and accelerating pipe section, 3 represents a gas circuit exit pipe section, 4 represents a case, 5 represents a vortex flow guide spiral pipe, 6 represents a gas discharge pipe, 7 represents a liquid receiving cone, 8 represents a cone mixer pipe section, 9 represents a mixed liquid relief exit connection pipe section flange, 10 represents a sampler, and 11 represents an sampler exit connection pipe section.

The multiphase flow adjusting apparatus of the embodiment is constituted as follows: the inlet connection flange 1 is connected with an oil-gas-water multi-phase flow pipeline and sequentially connected with the inlet inside reducing and accelerating pipe section 2 and the vortex flow guide spiral pipe 5, the gas discharge pipe 6 is mounted in the center of the vortex flow guide spiral pipe 5, the liquid receiving cone 7 is connected above the cone mixer pipe section 8; the sampler 10 and the sampler exit connection pipe section 11 are connected sequentially, and to outside through the sampler exit connection pipe section.

The gas circuit exit connection pipe section 3 is mounted on the top of the apparatus, and can be connected with a flow collection pipe through a flange, the mixed liquid relief exit pipe section 9 is provided in position at the lower end of the case 4, and a sampler liquid reservoir is naturally formed below the relief exit.

Its process is as follows: the oil-gas-water multi-phase flow is accelerated through the inlet inside reducing and accelerating pipe section 2 and then enters into the vortex flow guide spiral pipe 5 to run a circumferential vortex flow. The gas-liquid two phase separation is achieved under the action of centrifugal force of the vortex flow, and the separated gas is discharged from the center of the gas discharge pipe 6 and enters into the flow collection pipe via the gas circuit exit connection pipe section 3. The separated liquid enters the liquid receiving cone 7 along a wall and is subjected to a secondary vortex separation to make the residual gas to be further separated, and the separated liquid will be mixed into oil-water liquid phase through the cone mixer pipe section 8. The mixed liquid enters naturally into the sampler liquid reservoir, then is sampled by the sampler 10 and via the sampler exit connection pipe section 11 flows into an outside connected dual-$\gamma$ phase volume fraction meter, where the water content is to be measured. The position of the mixed liquid relief exit pipe section 9 is determined according to the magnitudes of the liquid flow rate of the sampler and the gas content, and serves to control the level of the liquid reservoir. The oil-gas-water multi-phase flow adjusting apparatus of the present invention is used in an oil-gas-water multi-phase flow rate measuring apparatus, so that the adapted measurement range of the multiphase flow measuring apparatus is greatly extended for the oil-gas-water multi-phase flow, and at the same time the accuracy of the measurement is improved.

Figure 2:
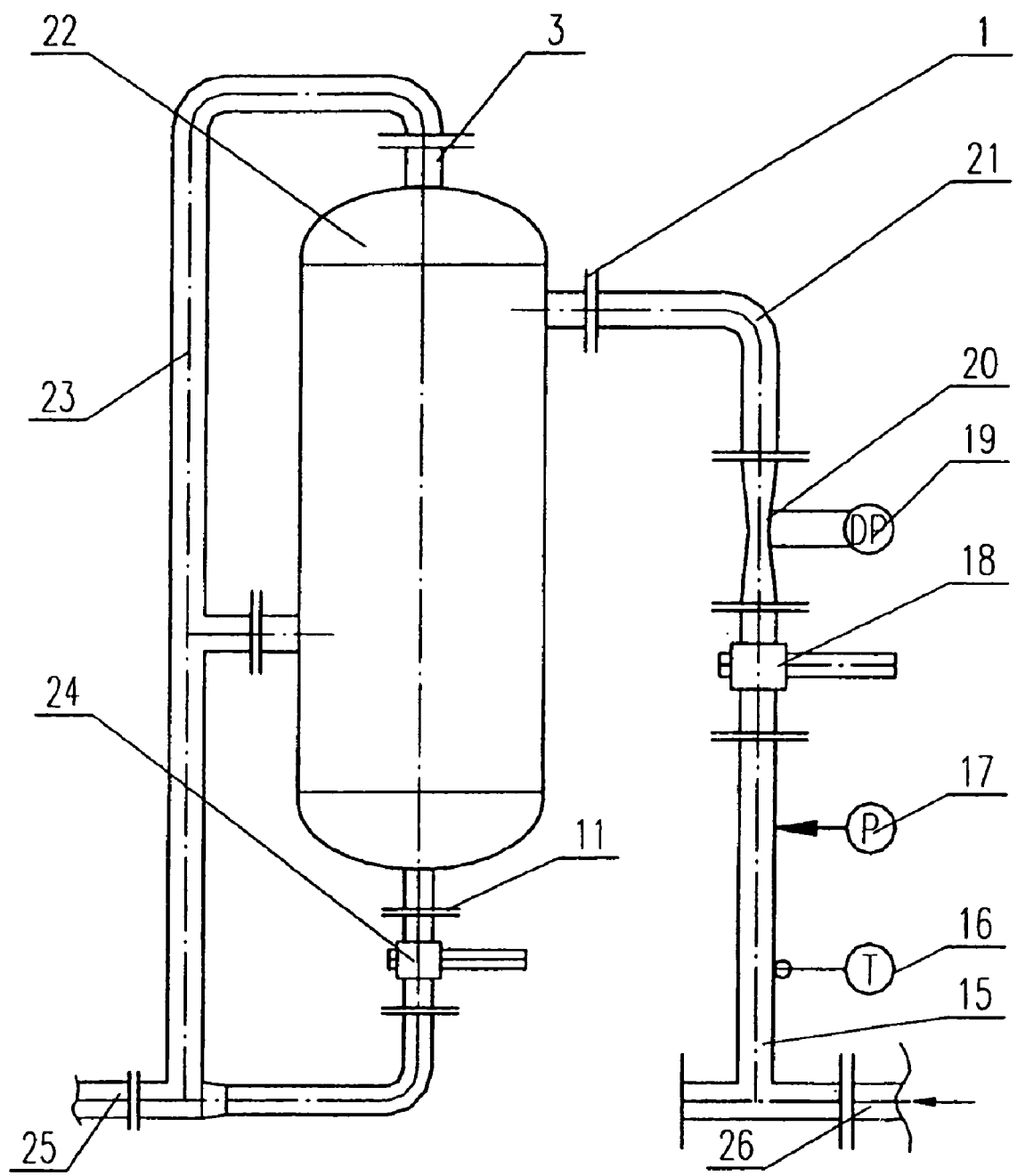
FIG. 2 is a schematic diagram of an embodiment of an oil-gas-water multi-phase flow rate measuring apparatus using the oil-gas-water multi-phase flow adjusting apparatus of the invention.

FIG. 2 shows an embodiment of an oil-gas-water multi-phase flow rate measuring apparatus using the oil-gas-water multi-phase flow adjusting apparatus of the present invention.

A reference number 1 represents an inlet connection flange, 2 represents an inlet accelerating pipe section, 3 represents a gas circuit exit connection pipe section, 9 represents a mixed liquid relief exit pipe section, 11 represents a sampler exit connection pipe section, 15 represents a blind three-way mixing means, 16 represents a temperature transducer, 17 represents a pressure transducer, 18 represents a single-γ phase volume fraction meter, 19 represents a pressure differential transducer, 20 represents a pressure differential type flow measuring device, 21 represents a connection pipe section, 22 represents the oil-gas-water multi-phase flow adjusting apparatus of the present invention, 23 represents a flow collection pipe section, 24 represents a dual-γ phase volume fraction meter, 25 represents an oil pipe metering exit end and 26 represents an oil pipe metering inlet end.

The oil-gas-water multi-phase flow rate measuring apparatus of the embodiment is constituted as follows: at the oil pipe metering inlet end 26, the blind three-way mixing means 15, the single-γ phase volume fraction meter 18, the pressure differential type flow measuring device 20 and the connection pipe section 21 are successively mounted, while the inlet connection flange 1 of the multiphase flow adjusting apparatus 22 is connected with the connection pipe section 21, the gas circuit exit connection pipe section 3 and the mixed liquid relief exit connection pipe section 9 of the oil-gas-water multi-phase flow adjusting apparatus 22 are connected to the flow collection pipe section 23 respectively, the sampler exit connection pipe section 11 is connected with the dual-γ phase volume fraction meter 24, the exit end of the dual-γ phase volume fraction meter 24 is connected in turn to the flow collection pipe section 23, the exit of the flow collection pipe section 23 is connected to the oil pipe 25, the temperature transducer 16 and the pressure transducer 17 are successively mounted to the blind three-way mixing means 15; the geometrical shape in the inner section of the inlet inside reducing and accelerating pipe section 2 is not limited, it may be circular or rectangular.

Its measurement process is as follows: the oil-gas-water multi-phase flow from an oil pipe first enters into the blind three-way mixing means 15 so that the original multi-phase flow is changed in flow state and mixed. The single-γ phase volume fraction meter 18 measures the gas content GVF of the oil-gas-water multi-phase flow, the pressure differential type flow measuring device 20 and the pressure differential transducer 19 measure the total flow rate Q by measuring the differential pressure value ΔP of the total flow rate, the temperature transducer 16 and the pressure transducer 17 measure the temperature and the pressure inside the pipe respectively; after the oil-gas-water multi-phase flow has flowed into the oil-gas-water multi-phase flow adjusting apparatus 22, the adjusted, separated and uniformly mixed oil-water liquid is sampled by the sampler, the sampled liquid via the sampler exit connection pipe section enters the dual-γ phase volume fraction meter 24, where the water content is to be measured, and then it enters the oil pipe via the flow collection pipe section 23.

All the measured data are calculated by a computer processing system, and then the measurement results, such as the flow rate each of the oil-gas-water multi-phase flow are output.

The computer data processing system is not shown in the schematic diagram FIG. 2 of the present apparatus.

The calculation equations are as follows:
The total flow rate: $Q = K \cdot \sqrt{\Delta p / \rho}$
The oil flow rate: $Q_o = Q \cdot (1-GVF) \cdot (1-WC)$
The gas flow rate: $Q_g = Q \cdot GVF$
The water flow rate: $Q_w = Q \cdot (1-GVF) \cdot WC$ Δp is the differential pressure formed by the multiphase flow passed through the pressure differential type flow measuring device, and is measured by the pressure differential transducer;

WC is the water content and is measured by the dual-γ phase volume fraction meter;

GVF is the gas content and is measured by the single-γ phase volume fraction meter;

ρ is the mixed density of the oil-gas-water multi-phase flow and can be obtained by the following equation:

$$\rho = [\rho_{water} \cdot WC + \rho_{oil} \cdot (1-WC)] \cdot (1-GVF) + \rho_{gas} \cdot GVF$$

$\rho_{water}$, $\rho_{oil}$ and $\rho_{gas}$ are the densities of water, oil and gas in the multi-phase flow respectively.

Based on the known compression factor and expansion coefficient of water, oil and gas, by using the measured temperature and pressure, the flow rate of each single phase of the oil-gas-water multi-phase flow under the standard state can be calculated.

In the test made in the invention, a $^{241}$Am single-γ phase volume fraction meter is used as the single-γ phase volume fraction meter 18, a Am+Ag dual-γ phase volume fraction meter is used as the dual-γ phase volume fraction meter 24, and a Venturi device is used as the pressure differential type flow measuring device 20.

It should be noted that, the above selected devices are only intended to be illustrative and not to limit the invention.

By testing, the above apparatus can achieve the following technical indexes:

1. The measurement range of the water content 0~100%
2. The measurement error of the water content<2%
3. The measurement range of the gas content 0~100%
4. The measurement error of the liquid daily production<5%
5. The measurement error of the gas daily production<10%

Figure 3:
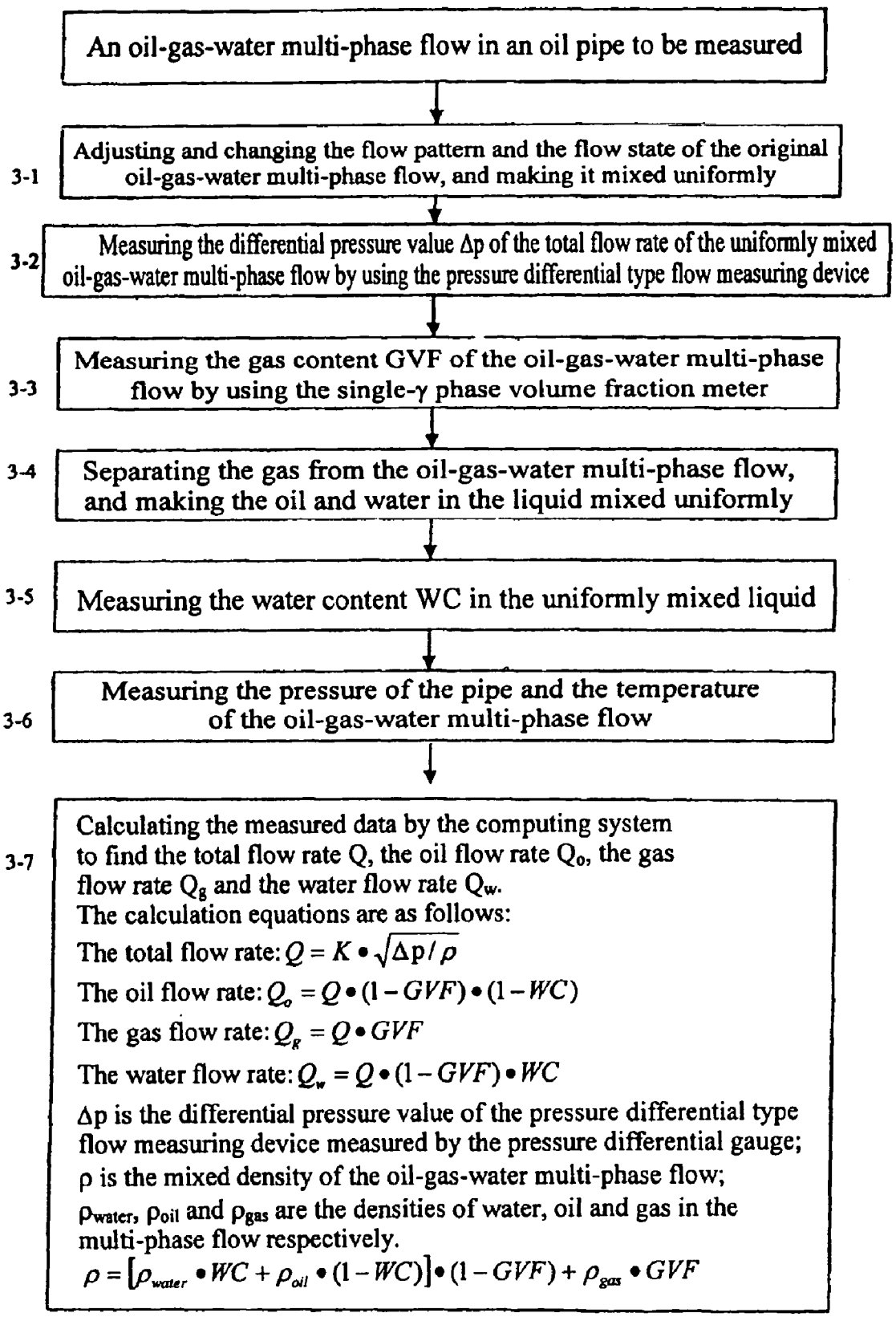
FIG. 3 is a main flowchart of an oil-gas-water multi-phase flow rate measuring method using the multiphase flow adjusting apparatus of the present invention.

FIG. 3 is the main flowchart of an oil-gas-water multi-phase flow rate measuring method using the oil-gas-water multi-phase flow adjusting apparatus of the present invention.

Steps:

3-1 Adjusting and changing the flow pattern and the flow state of the original oil-gas-water multi-phase flow, and making it mixed uniformly;

3-2 Measuring the differential pressure ΔP of the total flow rate of the uniformly mixed oil-gas-water multi-phase flow by using the pressure differential type flow measuring device to calculate the total flow rate Q;

3-3 Measuring the gas content GVF of the oil-gas-water multi-phase flow by using the single-γ phase volume fraction meter;

3-4 Separating the gas from the oil-gas-water multi-phase flow, and making the oil and water in the liquid mixed uniformly;

3-5 Measuring the water content WC in the uniformly mixed liquid;

3-6 Measuring the pressure of the pipe and the temperature of the oil-gas-water multi-phase flow;

3-7 Calculating the measured data by the computing system to find the total flow rate Q, the oil flow rate $Q_o$, the gas flow rate $Q_g$ and the water flow rate $Q_w$;

The calculation equations are as follows:

The total flow rate: $Q=K \cdot \sqrt{\Delta p/\rho}$

The oil flow rate: $Q_o=Q \cdot (1-GVF) \cdot (1-WC)$

The gas flow rate: $Q_g=Q \cdot GVF$

The water flow rate: $Q_w=Q \cdot (1-GVF) \cdot WC$ $\Delta p$ is the differential pressure value of the pressure differential type flow measuring device measured by the pressure differential gauge;

$\rho$ is the mixed density of the oil-gas-water multi-phase flow;

$\rho_{water}$, $\rho_{oil}$ and $\rho_{gas}$ are the densities of water, oil and gas in the multi-phase flow respectively.

The invention claimed is:

1. An oil-gas-water multi-phase flow adjusting apparatus, wherein an inlet inside reducing and accelerating pipe section is used for accelerating a oil-gas-water multi-phase flow, a vortex flow guide spiral pipe makes the oil-gas-water multi-phase flow move in vortex flow to separate gas, and a gas discharge pipe is a gas discharge channel at the center of the vortex flow; a liquid receiving cone with a broader opening facing toward the vortex flow guide spiral pipe configured to make the liquid move in natural vortex flow to realize a secondary gas-liquid separation, a mixer configured to receive liquid from a smaller opening of the liquid receiving cone and configured to mix the oil and water in the separated liquid to be uniform; the mounting position of a mixed liquid relief exit pipe section is used for controlling the level height of a liquid reservoir; the oil-gas-water multi-phase flow adjusting apparatus is mounted to an oil pipe for changing the original flow pattern and flow state of the oil-gas-water multi-phase flow, and for separating gas from the oil-gas-water multi-phase flow and mixing the separated liquid uniformly, and is integrated with the functions of separating gas from the oil-gas-water multi-phase flow, mixing the separated liquid uniformly, and continuously sampling the mixed liquid to form a complete multiphase flow adjusting apparatus.

2. The oil-gas-water multi-phase flow adjusting apparatus according to claim 1, wherein:
the inlet inside reducing and accelerating pipe section comprises an inner section with a geometrical shape that is one of circular or rectangular and
the vortex flow guide spiral pipe comprises an inner section with a geometrical shape that is one of circular or rectangular.

3. The oil-gas-water multi-phase flow adjusting apparatus according to claim 1, wherein the inlet inside reducing and accelerating pipe section is connected with a cylindrical surface of a case of the oil-gas-water multiphase flow adjusting apparatus tangentially or perpendicularly.

4. The oil-gas-water multi-phase flow adjusting apparatus of claim 1, additionally comprising an oil-gas-water multi-phase flow rate measuring apparatus, said oil-gas-water multi-phase flow rate measuring apparatus comprising:
a blind three-way mixing means;
a pressure differential type flow measuring device;
a single-$\gamma$ phase volume fraction meter;
a dual-$\gamma$ phase volume fraction meter;
a flow collection pipe section;
a sampler into which the mixed liquid enters;
a connection pipe section; and
a computing unit which are mounted to the oil pipe,
wherein said pressure differential type flow measuring device and said single-$\gamma$ phase volume fraction meter are mounted between the oil-gas-water multi-phase flow adjusting apparatus and the blind three-way mixing means, the single-$\gamma$ phase volume fraction meter is used to measure the gas content GVF, and the pressure differential type flow measuring device is used to measure the total flow rate of the oil-gas-water multi-phase flow, and
wherein the dual-$\gamma$ phase fraction meter is mounted between an exit of the sampler and the flow collection pipe section of the multiphase flow adjusting apparatus, and is used to measure the water content WC in the liquid phase.

5. The oil-gas-water multi-phase flow rate adjusting and measuring apparatus according to claim 4, wherein the blind three-way mixing means is provided with a temperature transducer and a pressure transducer, which measure the temperature and the pressure of the mixed liquid for calculating the volume flows of oil, gas and water under a standard state.

6. An oil-gas-water multi-phase flow rate adjusting and measuring method using the oil-gas-water multi-phase flow rate adjusting and measuring apparatus according to claim 4, comprising the following steps:
adjusting and changing the flow pattern and the flow state of the original oil-gas-water multi-phase flow, and making it mixed uniformly;
measuring the differential pressure $\Delta P$ of the total flow rate of the uniformly mixed oil-gas-water multi-phase flow by using the pressure differential type flow measuring device to calculate the total flow rate Q;
measuring the gas content GVF of the oil-gas-water multi-phase flow by using the single-$\gamma$ phase volume fraction meter;
separating the gas from the oil-gas-water multi-phase flow, and making the oil and water in the liquid mixed uniformly;
measuring the water content WC in the uniformly mixed liquid;
measuring the pressure of the pipe and the temperature of the oil-gas-water multi-phase flow;
calculating the measured data by the computing system to find the total flow rate Q, the oil flow rate $Q_o$, the gas flow rate $Q_g$ and the water flow rate $Q_w$ with the following equations:

the total flow rate: $Q=K \cdot \sqrt{\Delta p/\rho}$ the oil flow rate: $Q_0 = Q \cdot (1-GVF) \cdot (1-WC)$ the gas flow rate: $Q_g = Q \cdot GVF$ the water flow rate: $Q_w = Q \cdot (1-GVF) \cdot WC$ $\Delta p$ is the differential pressure value of the pressure differential type flow measuring device measured by the pressure differential gauge;

$\rho$ is the mixed density of the oil-gas-water multi-phase flow;

$\rho_{water}$, $\rho_{oil}$ and $\rho_{gas}$ are the densities of water, oil and gas in the multi-phase flow respectively.

7. An oil-gas-water multi-phase flow adjusting apparatus, wherein an inlet inside reducing and accelerating pipe section is used for accelerating a oil-gas-water multi-phase flow, a vortex flow guide spiral pipe makes the oil-gas-water multi-phase flow move in vortex flow to separate gas, and a gas discharge pipe is a gas discharge channel at the center of the vortex flow; a liquid receiving cone makes the liquid move in natural vortex flow to realize a secondary gas-liquid separation, a mixer mixes the oil and water in the separated liquid to be uniform; the mounting position of a mixed liquid relief exit pipe section is used for controlling the level height of a liquid reservoir; the oil-gas-water multi-phase flow adjusting apparatus is mounted to an oil pipe for changing the original flow pattern and flow state of the oil-gas-water multi-phase flow, and for separating gas from the oil-gas-water multi-phase flow and mixing the separated liquid uniformly, and is integrated with the functions of separating gas from the oil-gas-water multi-phase flow, mixing the separated liquid uniformly, and continuously sampling the mixed liquid to form a complete multiphase flow adjusting apparatus, wherein the vortex flow guide spiral pipe comprises inner and outer layers with openings.

8. The oil-gas-water multi-phase flow adjusting apparatus according to claim 1, wherein the vortex flow guide spiral pipe comprises inner and outer layers without openings.

9. An oil-gas-water multi-phase flow adjusting apparatus, wherein an inlet inside reducing and accelerating pipe section is used for accelerating a oil-gas-water multi-phase flow, a vortex flow guide spiral pipe makes the oil-gas-water multi-phase flow move in vortex flow to separate gas, and a gas discharge pipe is a gas discharge channel at the center of the vortex flow; a liquid receiving cone makes the liquid move in natural vortex flow to realize a secondary gas-liquid separation, a mixer mixes the oil and water in the separated liquid to be uniform; the mounting position of a mixed liquid relief exit pipe section is used for controlling the level height of a liquid reservoir; the oil-gas-water multi-phase flow adjusting apparatus is mounted town oil pipe for changing the original flow pattern and flow state of the oil-gas-water multi-phase flow, and for separating gas from the oil-gas-water multi-phase flow and mixing the separated liquid uniformly, and is integrated with the functions of separating gas from the oil-gas-water multi-phase flow, mixing the separated liquid uniformly, and continuously sampling the mixed liquid to form a complete multiphase flow adjusting apparatus, wherein a wall of a case of the oil-gas-water multiphase flow adjusting apparatus is forms a portion of the vortex flow guide spiral pipe.

10. The oil-gas-water multi-phase flow adjusting apparatus according to claim 1, wherein the vortex flow guide spiral pipe is separate from a case of the oil-gas-water multiphase flow adjusting apparatus.

\* \* \* \* \*

UNITED STATES PATENT AND TRADEMARK OFFICE
CERTIFICATE OF CORRECTION

PATENT NO. : 8,087,293 B2
APPLICATION NO. : 10/556999
DATED : January 3, 2012
INVENTOR(S) : Jianwen Dou et al.

It is certified that error appears in the above-identified patent and that said Letters Patent is hereby corrected as shown below:

- Column 8, Line 51 (Approx.), In Claim 6, please delete "$Q_0$" and insert --$Q_o$--.
- Column 10, Line 9, In Claim 9, please delete "town" and insert --to an--.
- Column 10, Line 18, In Claim 9, please delete "is forms" and insert --forms--.

Signed and Sealed this
Fifteenth Day of May, 2012

David J. Kappos
*Director of the United States Patent and Trademark Office*